(12) United States Patent
Tentrup

(10) Patent No.: US 10,724,925 B2
(45) Date of Patent: Jul. 28, 2020

(54) WHEEL RECEIVING AREA FOR A FUNCTION TEST STAND, AND METHOD FOR ACTUATING THE ADJUSTING MEANS OF A FLOATING PLATE

(71) Applicant: Dürr Assembly Products GmbH, Püttlingen (DE)

(72) Inventor: Thomas Tentrup, Merzig-Mechern (DE)

(73) Assignee: DURR ASSEMBLY PRODUCTS GMBH, Puttlingen (DE)

( * ) Notice: Subject to any disclaimer, the term of this patent is extended or adjusted under 35 U.S.C. 154(b) by 194 days.

(21) Appl. No.: 15/760,804

(22) PCT Filed: Sep. 14, 2016

(86) PCT No.: PCT/DE2016/100431
§ 371 (c)(1),
(2) Date: Mar. 16, 2018

(87) PCT Pub. No.: WO2017/045673
PCT Pub. Date: Mar. 23, 2017

(65) Prior Publication Data
US 2018/0259424 A1 Sep. 13, 2018

(30) Foreign Application Priority Data
Sep. 16, 2015 (DE) .......................... 10 2015 115 607

(51) Int. Cl.
*G01M 17/007* (2006.01)
(52) U.S. Cl.
CPC ............................... *G01M 17/0074* (2013.01)
(58) Field of Classification Search
CPC ................................................. G01M 17/0074
See application file for complete search history.

(56) References Cited

U.S. PATENT DOCUMENTS 6,473,978 B1  11/2002  Maas
6,739,185 B2 *  5/2004  Schoeninger ....... G01M 17/022
                                                        73/146
(Continued)

FOREIGN PATENT DOCUMENTS

DE          20105929 U1      8/2001
DE        102014111192 A1    2/2015

OTHER PUBLICATIONS

International Search Report for WO Application No. PCT/DE2016/100431, dated Jan. 26, 2017.

*Primary Examiner* — Freddie Kirkland, III
(74) *Attorney, Agent, or Firm* — Miller Canfield (57) ABSTRACT

The present invention relates to a wheel mount for a vehicle test bench for motor vehicles having steerable wheels, wherein the wheel mount comprises a floating plate as well as at least one roller supported on the floating plate and movable with the floating plate in a horizontal plane. According to the present invention, the wheel mount has a first working state, in which the part of the floating plate, on which the at least one roller is supported, is rotatably supported around a vertical axis, which is located ahead of the at least one wheel contact point on the at least one roller with respect to the driving direction of a vehicle located in the roller dynamometer. In addition, the wheel mount has a second working state, in which the part of the floating plate, on which the at least one roller is supported, is rotatably supported around a vertical axis, which is located behind the at least one wheel contact point with respect to the driving direction of a vehicle located in the roller dynamometer. Furthermore, actuators are assigned to the floating plate for rotating the part of the floating plate, on which the at least one roller is supported, around the corresponding axis in the first as well as in the second working state.

6 Claims, 6 Drawing Sheets

(56) References Cited

U.S. PATENT DOCUMENTS

| | | | | |
|---|---|---|---|---|
| 7,779,544 B2* | 8/2010 | Tentrup | ............... | G01B 5/255 |
| | | | | 33/203.12 |
| 8,061,045 B2* | 11/2011 | Grotz | ............... | G01M 17/06 |
| | | | | 33/203.12 |
| 2009/0288305 A1* | 11/2009 | Tentrup | ............... | G01B 5/255 |
| | | | | 33/203.12 |
| 2010/0001167 A1 | 1/2010 | Grotz | | |

* cited by examiner

WHEEL RECEIVING AREA FOR A FUNCTION TEST STAND, AND METHOD FOR ACTUATING THE ADJUSTING MEANS OF A FLOATING PLATE

PRIOR APPLICATIONS

This application claims priority to and all advantages of PCT/DE2016/100431, filed Sep. 14, 2016 and German Patent Application No. DE 102015115607.5, filed Sep. 16, 2015, the content of which is hereby incorporated by reference.

TECHNICAL FIELD

The present invention relates to a wheel mount for a vehicle test bench for motor vehicles having steerable wheels according to the preamble of claim 1 as well as to a method for actuating the actuators of a wheel mount according to claim 4.

BACKGROUND

When testing a driving vehicle on a roller dynamometer, brake dynamometer, ABS dynamometer (hereinafter referred to as vehicle test bench), according to the prior art, the vehicle must be brought in straight-ahead position with respect to the vehicle test bench through the steering and then the steering wheel is to be kept in straight-ahead position to prevent a lateral drift of the driving vehicle during the test. In a vehicle test bench, this is effected by a driver at the end of the belt of a final vehicle assembly. The cause for the lateral drifting are lateral forces, which are exerted on the tires by the rollers and which arise in particular in steering angles of the tires. Due to the progressive technical development in vehicle components, it is possible to autonomously drive vehicles also in the production under certain boundary conditions. Therefore, there is the option to test vehicles driverless in vehicle test benches.

One option for implementing driverless testing is to make a positioning of the vehicle in straight-ahead position with respect to the vehicle test bench by a regulation process. The actuating variable is the steering (steering angle of the vehicle). A deviation from the target position can be recognized by means of the detection of the situation of the vehicle in the test bench. Because the vehicle runs with simulated speeds of up to 120 km/h in the vehicle test bench and the danger of a damage of the vehicle, the test bench and a hazarding of the operational personnel is to be avoided, a malfunction of the regulation process must be avoided. Such a malfunction could, for example, be based on a defective signal transmission in a wireless transmission of the control signals to the vehicle. Therefore, the test bench must be equipped with extensive safety technology. This safety technology is expensive. The same applies to the layout of the regulator circuit with an intervention with the steerage of the vehicle. This intervention would only have to be implemented for this type of testing since such automated intervention does not occur in normal driving operation of the vehicle.

Another option is documented in EP 2 166 332 A2. Here, a bar is fastened in a point beside the vehicle and is fastened with the other end to the steering wheel of the vehicle (through the opened side window). A lateral drifting of the vehicle thus effects a steering angle which counteracts the lateral drifting. The disadvantage of this option is that the connection with the steering wheel needs to be carried out by a workman. Furthermore, fastening of the steering wheel must be configured in such a way that it works for all types of steering wheels, ensures a secure connection with the steering wheel and nevertheless leaves no traces on the steering wheel.

SUMMARY

The object of the invention is to avoid, in a manner as simple as possible, the drifting of the driving vehicle in the vehicle test bench largely independently of the steering wheel position and on the other hand, to position the driving vehicle in the vehicle test bench.

According to the invention, this object is achieved according to claim 1 by means of a wheel mount for a vehicle test bench for motor vehicles having steerable wheels, wherein the wheel mount comprises a floating plate as well as at least one roller supported on the floating plate and movable with the floating plate in a horizontal plane. According to the present invention, the floating plate has a first working state, in which the part of the floating plate, on which the at least one roller is supported, is rotatably supported around a vertical axis, which is located ahead of the at least one wheel contact point on the at least one roller of the floating plate with respect to the driving direction of a vehicle located in the vehicle test bench. Furthermore, the floating plate has a second working state, in which the part of the floating plate, on which the at least one roller is supported, is rotatably supported around a vertical axis which is located behind the at least one wheel contact point on the at least one roller of the floating plate with respect to the driving direction of a vehicle located in the roller dynamometer. Actuators are assigned to the floating plate for rotating the part of the floating plate, on which the at least one roller is supported, around the corresponding vertical axis in the first as well as in the second working state.

The indication of the position of the vertical axis in the first or the second working state to be ahead of or behind the wheel contact point on the at least one roller relates to the driving direction of a vehicle located in the roller dynamometer.

For purposes of simplification, coordinate systems as well as the position thereof are to be defined for the following explanation.

The Z axis is to describe a vertical axis.

Furthermore, a first Cartesian coordinate system X, Y, Z of the vehicle test bench is to be defined. Here, the positive X direction is to be the driving direction of a vehicle located in the vehicle test bench. Here, the positive Y direction is to denote the direction abeam to the left relative to a vehicle located in the vehicle test bench.

Furthermore, another Cartesian coordinate system x, y, z of the wheel mount is to be defined. The x direction of the wheel mount is to describe the direction in the horizontal plane which is oriented perpendicular to the at least one roller. The positive x direction corresponds to the direction in which a wheel in forward motion of a stand-on vehicle when the wheel axle is collinear to the y axis. The positive y direction corresponds to the direction to the left abeam to a wheel of the vehicle standing on the wheel mount.

The wheel mount comprises an operational position in which the floating plate of the wheel mount is completely clamped and not movable. This operational position is required so in order to allow for a vehicle drive into and drive out of the vehicle test bench. To that end, the floating plates are clamped.

For performing the function tests, the wheel mounts can comprise another operational position in which the floating plates are freely movable. This applies both to a displacement of the floating plate in X direction and Y direction and to a rotation of the floating plate about an axis in Z direction.

It has proven that, in a rotation of the wheel mount having the respective wheels standing thereon, it depends on the position of the (vertical) rotational axis of the wheel mount in the horizontal plane whether the position of the vehicle stabilizes through the rotation.

Here, another precondition is that the wheels of the vehicle rotate. That can as well mean, that also with rollers of the wheel mount being driven, the wheels of the vehicle are braked.

Further basic conditions for the stabilization consist in the respective drive state of the wheel and of the rollers of the wheel mount.

Here, the vehicle is secured in that it is mechanically held, for example, in its position in the vehicle test bench. Alternatively, the vehicle can be considered secured when the readjustment of the wheel mount for stabilizing the vehicle is effected so fast, that the lateral drifting of the vehicle has not yet started due to the inertia of the vehicle. In this case, the stabilization of the vehicle is effected prior to an instability being able to have an impact on a positional change of the vehicle.

According to claim 1, a wheel mount is proposed which has the required technical equipment, by means of the settable first or second working state of the wheel mount to make the position of the vertical rotational axis in the horizontal plane for a rotation of the floating plate and thus also of the rollers located on the floating plate (i.e. the orientation of the axes of the rollers in the horizontal plane) using the actuators in a stabilizing manner.

Here, claim 2 relates to the technical configuration in which the roller system of the wheel mount consists of a double roller in which the two rollers of this double roller system can be connected individually or also commonly to a drive system via switchable couplings.

In the configuration according to claim 3, coupling means of in each case one drive system are engaged with the wheel mount in such a way that by a blocking of one of the drive systems with simultaneous actuation of the other drive system the part of the floating plate, on which the at least one roller is supported, is rotated in the first working state or to the second working state.

Here, it has proven of particular advantage if the coupling means remain engaged. As a result, it becomes in particular also possible to immediately switch from the first working state to the second working state (and vice versa) through a switching process of the two drive systems such, that the drive system which was in the blocked position is switched to the actuating position, and the other drive system which was in the actuating position is switched to the blocked position. In particular, the coupling means do not have to be mechanically brought into engagement first in such a configuration. The switching process is effected via a corresponding actuation of the drive systems of the coupling means.

Particularly advantageously, the coupling means are supported at the wheel mount in such a way that this support compensates the movement upon rotation of the part of the floating plate, on which the at least one roller is supported, in the ±X direction. As a result, it is made possible to use linear drives as actuators for a rotational movement. This proves to be advantageous in so far as the linear drive is simple in terms of construction.

Claim 4 describes a method for actuating the actuators of a floating plate according to one of claim 1, 2, or 3, in which the part of the floating plate, on which the at least one roller is supported, is rotated to a target position using the actuators, in such a way that the axis of the at least one roller of the wheel mount runs parallel to a projection of the wheel axle of the wheel standing on the at least one roller in vertical direction into the horizontal plane, wherein the rotation is effected in the first working state of the wheel mount or in the second working state of the wheel mount, depending on the direction and magnitude of a steering angle of the vehicle wheel as well as further depending on whether the vehicle wheel drives or brakes the at least one roller or is driven or braked by the at least one roller.

It has shown that the wheel mount and thus also the longitudinal axes of the roller of the wheel mount can be made to follow the steering movements of the wheels with these rotations in such a way that no lateral forces are transferred to the vehicle through a rotation of the wheel relative to the rollers of the wheel mount.

This makes it possible to keep or to position the vehicle in the vehicle test bench in transverse direction in a secure and stable manner. The lateral forces arising during steerage of the driving vehicle can be eliminated by the present invention in a controlled manner.

The actuation of the target position of the floating plate in the method according to claim 4 can be effected through a control or also through a regulation process, in which the position of the vehicle in the vehicle test bench in transverse direction is evaluated.

This proves to be advantageous in so far as nothing requires adaption on the steering wheel of the vehicle. This advantageously affects the cycle time in the current production process since the changeover time for coupling and decoupling of a connecting element to the steering wheel of a vehicle can be saved. Damages on the steering wheel due to the coupling and decoupling can also be avoided.

Claim 5 describes a possible procedure in order to determine whether the wheel mount with one roller or with coupled double rollers is to be operated in the first working state or in the second working state.

Here, a setting of the first or the second working state of the wheel mount is effected depending on at least one of the combinations of the dynamic state of the vehicle as well as the dynamic state of the individual roller or the coupled double rollers of the wheel mount by means of values according to the tables 1a as well as 1b.

Here, it is apparent that not all cells of the tables 1a and 1b correspond to reasonable operational states of the vehicle test bench. In so far, some of the combinations of the operational states may remain unconsidered when setting the front pinning or the back pinning, respectively.

Claim 6 relates to a method which refers to a technical configuration of the wheel mount with a double roller in which both rollers can in each case be coupled to the drive system using a coupling. Here, the switchable couplings of the double rollers of at least one wheel mount of the vehicle test bench are switched in such a way that a roller runs freely, i.e. without drive, and thus is only driven or braked by the vehicle. As a result, the torque can be influenced in terms of stabilization of the floating plate of the wheel mount with respect to the first or the second working state.

With the present invention, vehicles (with tires) can be tested on a vehicle test bench in simulated driving operation with substantially arbitrary steering angles.

This is advantageous compared to currently known vehicle test benches in which such tests are only possible with the "steering wheel in straight-ahead position". A currently known vehicle test bench for testing vehicles with substantially arbitrary steering angles is known from EP 1 596 179 A2. In this case, however, an adaption of the vehicle without tires takes place via the reception of the vehicle wheel.

The device according to the invention according to claim 1 advantageously consists of the following components:
K1: switchable and steerable floating plate
K2: linear drive with measurement of path and force
K3: driven roller set on the floating plate
K4: measuring system for the position of the vehicle with respect to the vehicle test bench, possibly chassis geometry measuring system The use of the lateral force of a roller pair driving the tire rotation for positioning a vehicle on a test bench is documented in EP 1 143 219 A2. In contrast to this patent, the wheel mount according to the invention consisting of the components K1, K2 and K3 has to satisfy other and additional requirements:

The component K1 relates to the floating plate as such which has to be switchable at least with respect to the first and the second working state and furthermore has to be rotatable around the vertical axis that in each case results from these two working states. Here, the floating plate in these two working states advantageously continues to be still displaceable in X direction as well as in Y direction. Only the degree of freedom of rotation of the floating plate around a vertical axis is determined in so far as the position of the vertical rotational axis of the floating plate is defined in the horizontal plane.

The floating plate has to carry the weight of the roller set (possibly with drive) of a vehicle test bench and the weight of at least ¼ of the vehicle, to be able to freely move in a defined region on the X, Y plane (horizontal plane) and to be securable at least in the degrees of freedom of translation (X, Y) so that the axes x, y, z of the coordinate system of the wheel mount are collinear to the axes X, Y, Z of the vehicle test bench. The degree of freedom of rotation φ must be securable with arbitrary angle. Such a floating plate with this clamping mechanism is for example known from DE 10 2014 111 192 A1. But also other types of floating plates can be used if they have the mentioned and required properties.

The rotatability of the floating plate is possible within the scope of the present invention in a particularly simple and cost-efficient manner if a linear drive is present which acts on the floating plate so that with this linear drive, a torque can be applied around the vertical axis of the first working state of the floating plate as well as a torque around the vertical axis of the second working state of the floating plate. In this configuration, it is advantageously possible to provide only one linear drive. Of course, it is also possible to provide multiple linear drives which produce the torques around the respective vertical axis or also other drives with which the respective torques can be produced.

When using two linear drives in Y direction, these can cooperate in such a way, that the position of the vertical rotational axis in the horizontal plane is defined through a securing of one of the linear drives, wherein a defined torque can be applied around this vertical rotational axis using the other linear drive.

The linear drive or the linear drives are the actuators in terms of the present invention. For the implementation of the present invention, this (these) component(s) K2 can be designed to be more powerful than the drives described in EP 1 143 219 A2. Moreover, these can also have a force measurement besides the path measurement.

When using two linear drives in ±Y direction, a linear guidance can be arranged in the X direction (longitudinal direction of a vehicle located in the test bench) ahead of the floating plate, and the other one behind the floating plate. The connections to the floating plate can be effected via in each case one fixed bolt per linear drive in the corresponding slot in the front and the rear in the floating plate. However, it is also possible to provide only one linear guidance in the X-direction with two switchable bolts ahead of and behind the floating plate in the X direction.

The component K3 is a driven roller system on the floating plate. This roller system is accelerated or braked by the wheel in real driving operation or the wheel is accelerated or braked by the roller set. The respective dynamic state depends on which function of the vehicle is to be tested at the moment. The roller set can
  be a double roller, wherein both rollers of the double roller are coupled to a drive
  be a double roller, wherein only one of the rollers is coupled to the drive
  be a double roller, wherein each roller of the double roller is coupled to the drive with a switchable coupling or also
  be an apex roller which is coupled to a drive. Holding rollers are also provided in addition to the apex roller.

In terms of these optional configurations, the wheel mount comprises at least one roller.

The drive of the roller set can be located on the floating plate together with the roller system or be connected to the roller system with a coupling (cardan shaft) being flexible with respect to the steering.

The component K4 (measuring system for the position of the vehicle with respect to the vehicle test bench, possibly chassis geometry measuring system) enables to cause the rotation of the floating plates using the actuators in such a way, that the position of the vehicle in the vehicle test bench is controlled in terms of a regulation process. Here, deviations of the vehicle from the target position thereof can be minimized or compensated, through a corresponding rotation of the floating plates.

Claim 2 relates to a configuration of the wheel mount in which the at least one roller of the wheel mount consists of a double roller, wherein each of the rollers is connected to a drive system via a switchable coupling.

This proves to be advantageous for adjusting a torque in a targeted manner by means of switching one of the two couplings.

BRIEF DESCRIPTION OF THE DRAWINGS

The figures show in.

DETAILED DESCRIPTION

Figure 1:
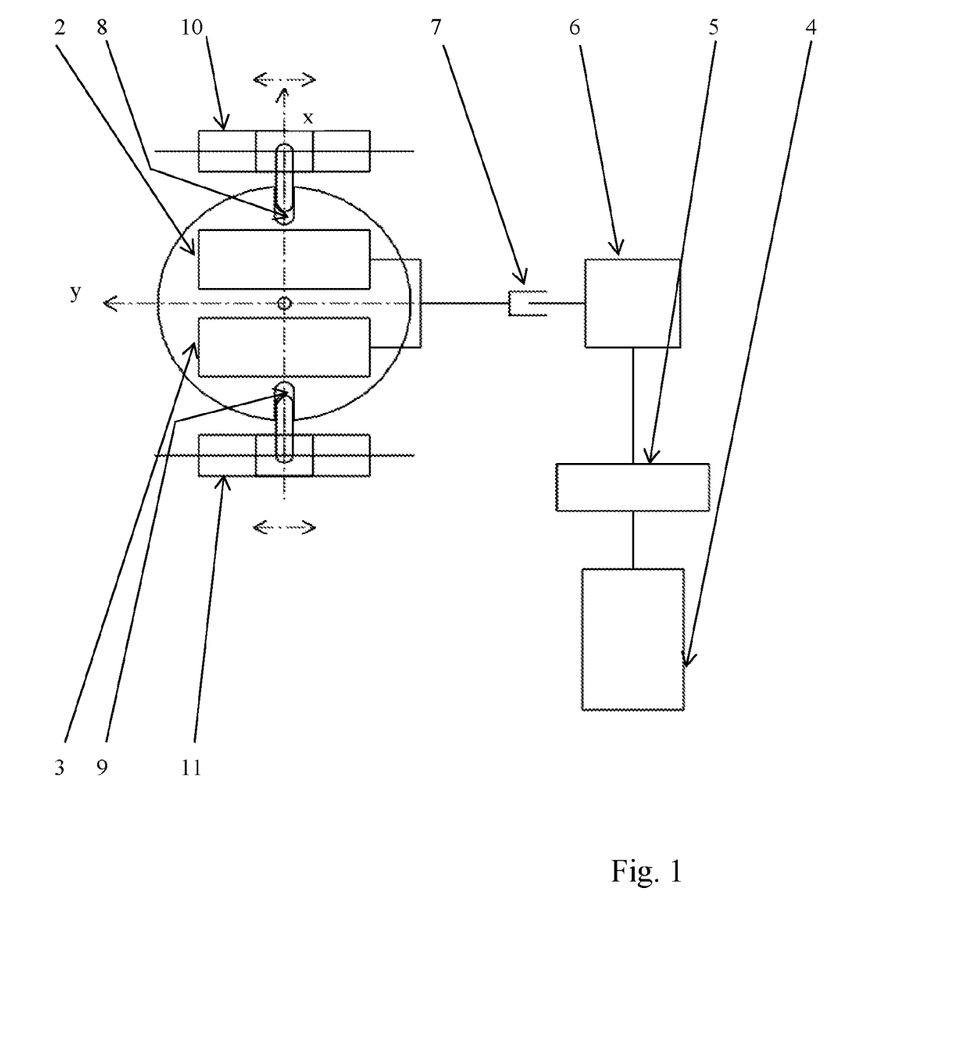
FIG. 1: a wheel mount with an exterior drive.

FIG. 1 shows a wheel mount according to the present invention with an exterior drive.

The FIG. 1 shows a wheel mount according to the present invention with a drive of the roller set which acts on the rollers 2, 3 of the double roller 1 from outside.

In the exemplary embodiment illustrated, the drive consists of a drive motor 4, which can be an electric, pneumatic or hydraulic motor, an oscillating mass 5 as well as a gear mechanism 6. Depending on the drive motor 4, the drive can also be configured without the gear mechanism 6. It is also possible to configure the drive without the oscillating mass 5. An adjusting element 7 can also be discerned, so that the drive can remain coupled to the double rollers when the floating plate is rotated. This adjusting element 7 can be, a homokinetic jointed shaft, for example.

In addition to the wheel mount, also the bolts 8 and 9 in the slots ahead of and behind the double roller can be discerned, as well as the associated linear drives 10 and 11. With the linear drives 10 or 11, respectively, the floating plates are moved in ±Y direction relative to the bolts 8 and 9.

This movement is effected in such a way that the floating plate is secured with respect to one of the bolts 8 or 9. There, the floating plate is moved laterally by the linear drive at the other bolt. The floating plate thereby rotates due to the securing at the other bolts. Here, the bolts and the slots are measured clearance sufficient to such an extent, that the slots are aligned in y direction but still allow for rotation of the floating plate around the other bolt.

Thus, FIG. 1 shows an embodiment in which coupling means 8, 9 of in each case one drive system 10, 11 are engaged with the wheel mount in such a way that by a blocking of one of the drive systems 10, 11 with simultaneous actuation of the other drive system 11, 10 the part of the floating plate, on which the at least one roller is supported, is rotated in the first working state or in the second working state.

Here, it proves advantageous that the coupling means 8, 9 (in the exemplary embodiment illustrated, these are the bolts 8, 9 which are guided in the corresponding slots) remain engaged. As a result, it becomes in particular also possible to immediately switch from the first working state to the second working state through a switching process of the drive systems 10, 11 from the actuating position to the blocked position and vice versa.

As the bolts 8, 9 in the guidance thereof in the slots compensate the movement when rotating the part of the floating plate, on which the at least one roller is supported in ±X direction, it is possible in the exemplary embodiment of FIG. 1 to use a linear drive 10, 11 as actuators for a rotational movement. This proves to be advantageous in so far as the linear drive is simple in terms of construction.

As an alternative to the illustrated exemplary embodiment of FIG. 1, the drive of the roller set can also be integrated in the wheel mount per se. For example, the drive can be arranged on the floating plate. As a result, the construction is simplified as the adjusting element 7 can be omitted if the drive rotates together with the floating plate. However, in this configuration, through the higher mass of the wheel mount, the inertia thereof and in particular the torque of inertia increase, so that the dynamic of making the wheel mount follow the steering movements of the wheels is negatively influenced.

Figure 2:
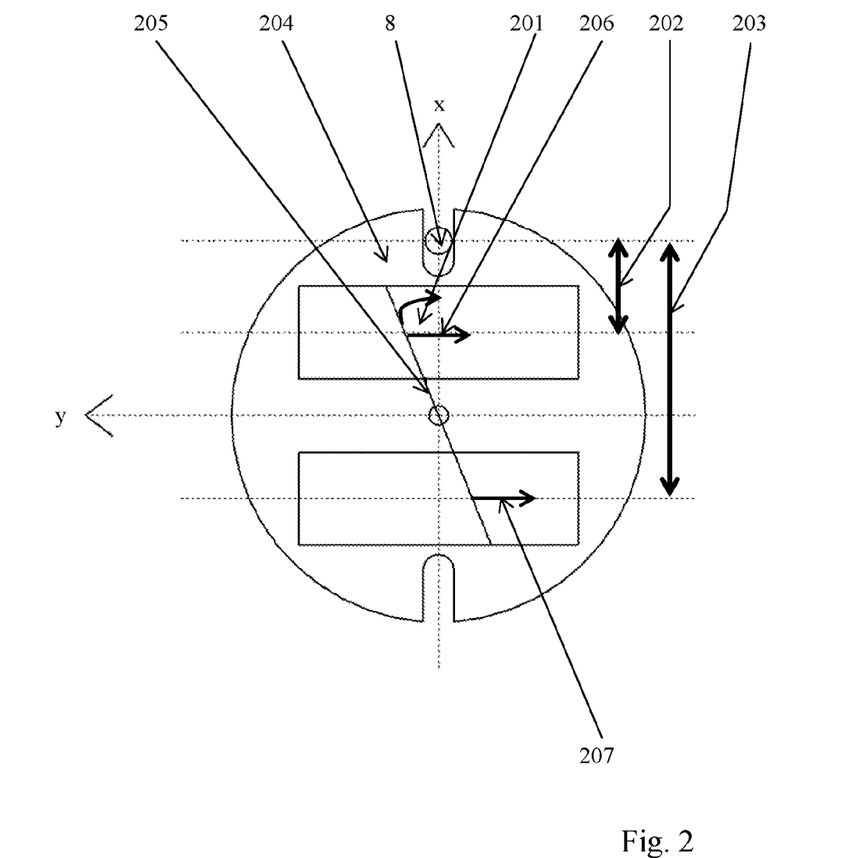
FIG. 2: a wheel mount with pinning in the front

FIG. 2 shows a wheel mount with pinning in the front. The wheel mount passively adjusts to α=0 with respect to this basic condition of roller system and wheel.

Here, the wheel is secured, rotates forward and drives both rollers. An angle α>0 is denoted with the reference character 201. The variable $d_v$ is denoted with the reference character 202, the variable $d_h$ with the reference character 203.

The floating plate 204 is rotatable around the bolt 8 in the front slot. In the back slot, no bolt is present so that the floating plate is rotatable around the bolt 8.

The projection of the wheel center plane in the x-y-plane is denoted with the reference character 205.

Furthermore, the lateral force $F_{yv}$ acting from the tire on the front roller is denoted with the reference character 206 and the lateral force $F_{yh}$ acting from the tire on the back roller is denoted with the reference character 207.

Figure 3:
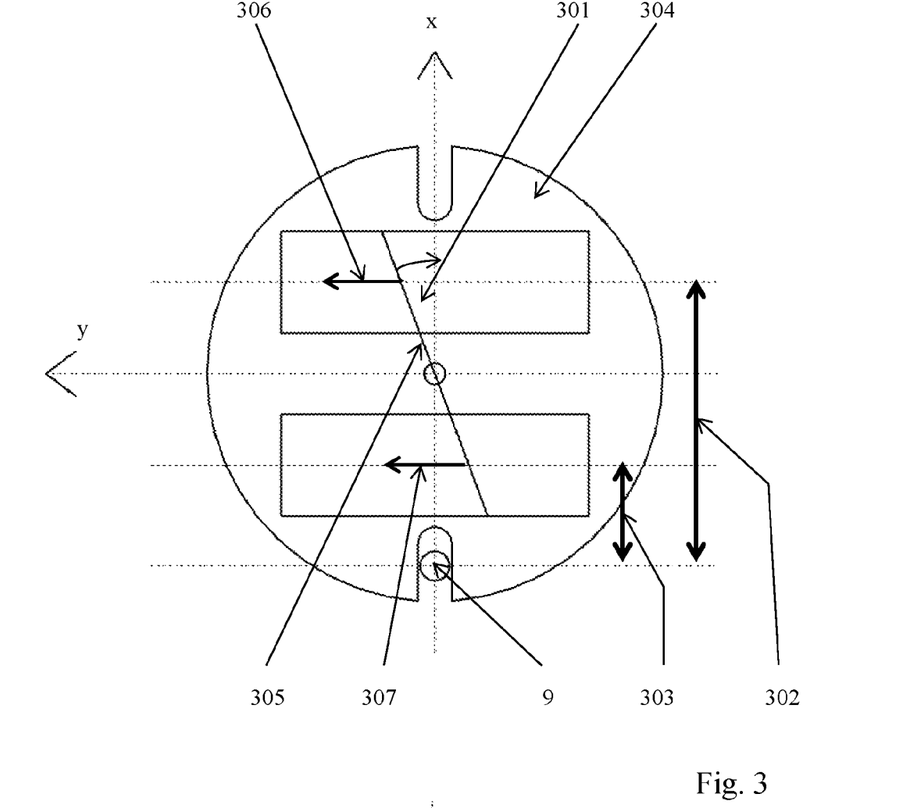
FIG. 3: a wheel mount with pinning in the back.

FIG. 3 shows a wheel mount with pinning in the back. The wheel mount passively compensates to α=0 with respect to this basic condition of roller system and wheel.

Here, the wheel is secured, rotates forward and is driven by both rollers. An angle α>0 is denoted with the reference character 301. The variable $d_v$ is denoted with the reference character 302, the variable $d_h$ with the reference character 303.

The floating plate 304 is rotatable around the bolt 9 in the back slot. In the front slot, no bolt is present so that the floating plate is rotatable around the bolt 9.

The projection of the wheel center plane on the x-y-plane of the wheel mount is denoted with the reference character 305.

Furthermore, the lateral force $F_{yv}$ acting from the tire on the front roller is denoted with the reference character 306 and the lateral force $F_{yh}$ acting from the tire on the back roller with the reference character 307.

Figure 4:
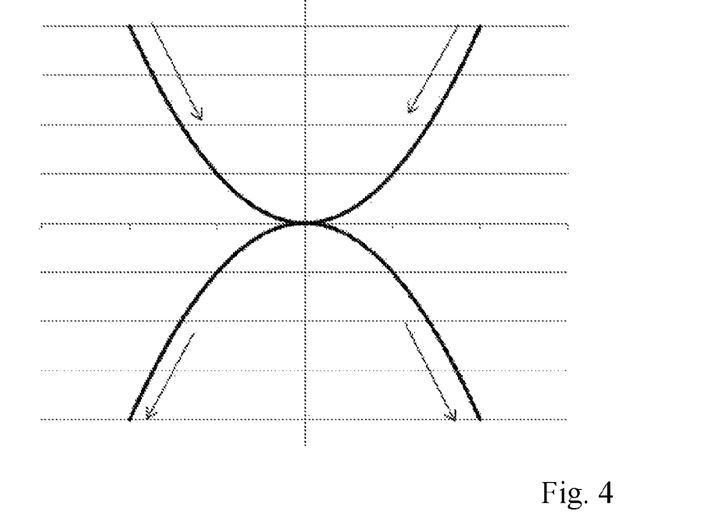
FIG. 4: the lateral forces on the non-secured linear drive of the floating plate.

FIG. 4 shows the lateral forces of the non-secured linear drive of the floating plate. The lateral force is plotted against the angle α.

The upper parabola shows a stable course which turns into a balanced state, i.e. runs toward an angle α=0. For the upper parabola α*M>0 is true.

The lower parabola shows an instable course which departs from the balanced state, i.e. runs away from the angle α=0. For the lower parabola α*M<0 is true.

Figure 5:
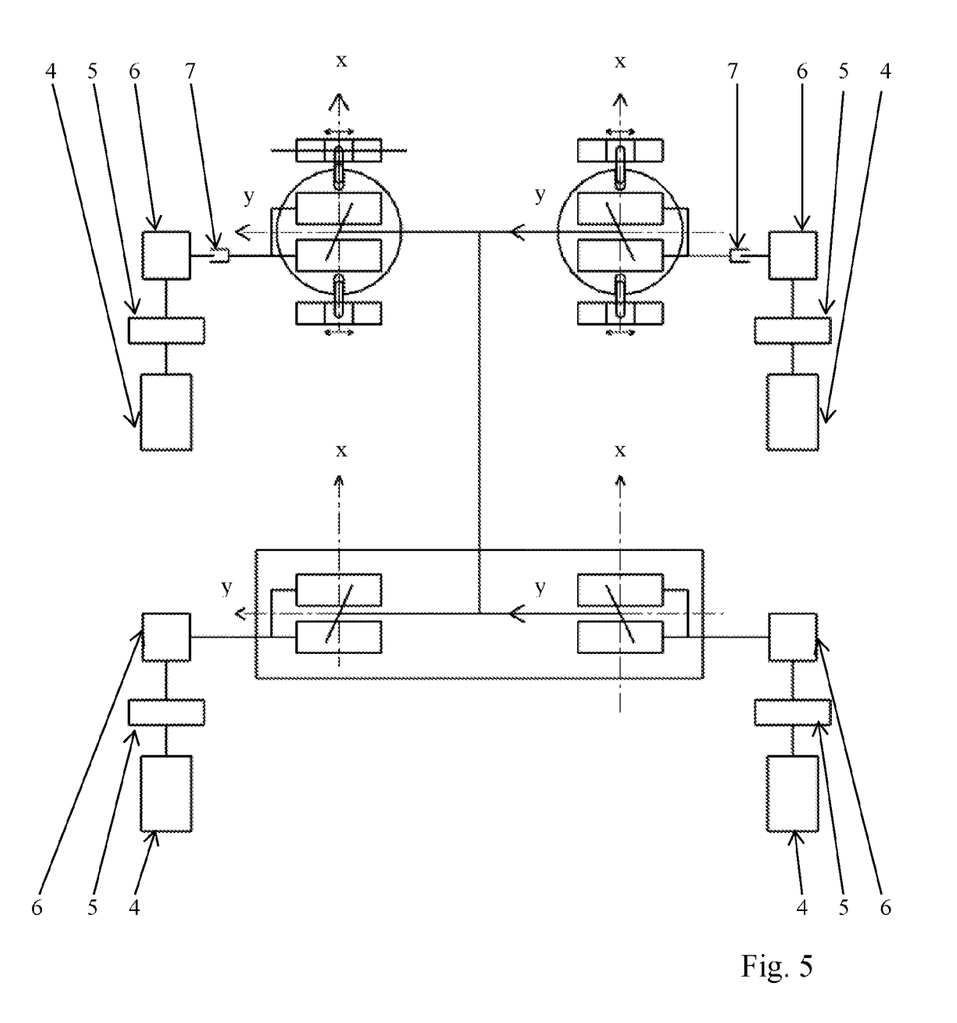
FIG. 5: a schematic diagram of a vehicle test bench with steerable wheel mounts below the front axle of a secured vehicle

FIG. 5 shows a schematic illustration of a vehicle test bench with steerable wheel mounts below the front axle of a vehicle which is to be considered secured. As already described, the vehicle can be secured by mechanically holding the vehicle. The vehicle can also be considered secured in terms of the present invention if the dynamic of the movements of the wheel mounts is so fast that states which exert forces on the vehicle in terms of a lateral drifting of the vehicle are already compensated and eliminated through the rotation of the wheel mount before the lateral drifting of the vehicle begins. The dynamic required therefore of the movement of the wheel mount is in direct correlation with the inertia of the vehicle.

Again, parts of the drives can be discerned, which have already been explained in conjunction with FIG. 1. Here, no adjusting elements 7 have to be provided in the drives at the rear axle (due to the non-steerable wheels of the rear axle) in the exemplary embodiment of FIG. 5.

For the following description of the invention, the wheel mount, without limiting the generality, consists of the component K3 which here is configured as a driven roller system in the type of a double roller. In the exemplary embodiment, both rollers are coupled to a drive which is not on the floating plate, i.e. is coupled thereto from the outside. In addition, two linear drives are present as the component K2. In each case one of the linear drives in ±Y direction is arranged ahead of and one behind the floating plate. The linear drives are furthermore equipped with a measuring device for measuring force and path. In the exemplary embodiment, the component K1 consists of a floating plate corresponding to DE 10 2014 111 192 A.

Hereinafter, the lateral force from the wheel (the tire) on the rollers is to be described. To that end, a coupled pair of rollers, i.e. the two driven rollers, is to be braked or be able to freely rotate.

The pair of rollers stands on a floating plate which can be pinned via a bolt in the front (x>0) or back (x<0) slot, that means, that the bolt presents a solid rotational axis in the vertical direction in the front or back for the wheel mount.

The y axis of the x, y coordinate system of the wheel mount is defined by the roller axes. A wheel rotates on the pair of rollers and the projection of the wheel center plane forms the angle $\alpha$ together with the x axis of the wheel mount (the pair of rollers).

When the wheel rotates forward, the rollers rotate backward. Here, forward rotation is to be defined in that the rotating object rotates counterclockwise around the rotational axis thereof (the y axis), according to the definition in FIG. 1.

Hereinafter, the wheel is to be considered as secured and the wheel mount in the supporting plane of the floating plate as freely moveable.

In the case that the wheel drives both rollers, a same lateral force $F_y$ acts on each roller in negative y direction for $\alpha>0$ in the case illustrated in FIG. 2.

The pinning in the front generates the torque M with $$M=-(d_v+d_h)*F_y \quad (1)$$

where $d_v$ is the x distance of the front roller to the pinning (i.e. the position of the vertical rotational axis) and $d_h$ is the x distance of the back roller to the pinning. As the lateral forces $F_y$ are negative for $\alpha>0$, thus the torque M is positive.

If the friction of the floating plate allows for it, the wheel mount rotates until the angle $\alpha$ is zero and thus a stable balance is achieved.

The lateral forces $F_y$ are positive for $\alpha<0$ and the torque thus is negative: Even in this case, the floating plate rotates until the angle $\alpha$ is zero and thus a stable balance is achieved if the friction of the floating plate permits it.

In this case (wheel drives rollers) with pinning in the front $$\alpha>0, F_y<0 \text{ and } M=-(d_v+d_h)*F_y>0 \quad (2)$$

$$\alpha<0, F_y>0 \text{ and } M=-(d_v+d_h)*F_y<0 \quad (3)$$

is true.

In the case that both rollers drive the wheel, a lateral force $F_y$ acts on each roller in positive y direction for $\alpha>0$. The relationships are illustrated in FIG. 3. The pinning in the back generates the torque M with $$M=(d_v+d_h)*F_y \quad (4)$$

wherein $d_v$ is the x distance of the front roller to the pinning and $d_h$ is the x distance of the back roller to the pinning.

As the lateral forces $F_y$ are positive, the torque M thus is positive. Thus, the wheel mount rotates until the angle $\alpha$ is zero and thus a stable balance is achieved if the friction of the floating plate permits it. For $\alpha<0$, the lateral forces $F_y$ are negative and the torque thus is negative and also in this case, the floating plate rotates until the angle $\alpha$ is zero and thus a stable balance is achieved if the friction of the floating plate permits it.

In this case (rollers drive the wheel) with pinning in the back $$\alpha>0, F_y>0 \text{ and } M=(d_v+d_h)*F_y>0 \quad (5)$$

$$\alpha<0, F_y<0 \text{ and } M=(d_v+d_h)*F_y<0 \quad (6)$$

is true.

The signs of the lateral forces are different with respect to the dynamic state of wheel and roller system.

These signs of the lateral forces can be taken into consideration upon movement of the floating plate using the actuators by activating the pinning in the front or back. With this procedure, a stable balance at $\alpha=0$ can be obtained. It is possible to obtain a passively compensating wheel mount under the basic condition of little friction of the floating plate.

In general, the following is true:

The wheel mount has a stable balance at $\alpha=0$ if for the resulting torque M, which is calculated from the position of the pinning (in the front or back) and the occurring lateral forces $F_y$, $$\alpha*M>0 \quad (7)$$

is true.

In the case of $\alpha*M<0$, an instable balance exists at $\alpha=0$.

It can be achieved with the present invention that the wheel mount is controlled or regulated in such a way, that a stable balance at $\alpha=0$ can be ensured depending on the operational state of the roller system and of the vehicle and therefore of the wheel.

To that end, the lateral force on a roller with a secured wheel is to be examined, wherein the center plane of the wheel has an angle $\alpha$ to the x axis of the roller under the conditions of the driving vehicle on a vehicle test bench.

The operational states of the wheel are:
wheel drives roller or
wheel brakes roller
The operational states of the roller are:
roller drives wheel or
roller brakes wheel The dynamic states of the roller are known from the engine control of the vehicle test bench. The dynamic states of the vehicle and thus of the wheel are known via the communication with the control units of the vehicle, in particular if the vehicle is driven autonomously on the vehicle test bench. The communication can be effected in the current production by requesting data of the control units of the vehicle and can be available in the data processing of the production process. This can be effected, for example, via a central master computer in the production which again forwards this data to the corresponding places in the production line in a decentralized manner.

Depending on the dynamic states of wheel and roller, for the lateral force acting on the roller $$F_y=c*\alpha*S \quad (8)$$

is true.

The variable "S" here is a summing up of all forces in terms of amount. These forces relate to the variable of the lateral force depending on the friction between tire and roller and the occurring drive forces or brake forces of roller and wheel. Thus, the force $F_y$ can be interpreted as proportional to the steering angle $\alpha$ and proportional to the variable c, with c=1 or c=−1 depending on the dynamic states of roller and wheel according to the tables 1a and 1b.

For the case "pinning in the front", $$M=-c*(d_v+d_h)*\alpha*S \quad (9)$$

results for the torque by putting (8) into (1).

Putting (9) in the stability condition (7) α*M>0 results in:

$$\alpha*M=-c*(d_v+d_h)*\alpha^2*S \quad (10)$$

Thus α*M>0 if c=−1.

For the case "pinning in the back", $$M=c*(d_v+d_h)*\alpha*S \quad (11)$$

results for the torque by putting (8) into (4).

Putting (11) into the stability condition (7) α*M>0 results in:

$$\alpha*M=c*(d_v+d_h)*\alpha^2*S \quad (12)$$

Thus α*M>0 if c=1.

TABLE 1a

| Case | Wheel rotates forward, α > 0 c-sign of the lateral force | Dynamic state of the roller — Roller drives wheel | Dynamic state of the roller — Roller brakes wheel | Dynamic state of the vehicle — Wheel drives roller | Dynamic state of the vehicle — Wheel brakes rollers |
|---|---|---|---|---|---|
| 1 | + | X | | | |
| 2 | − | | X | | |
| 3 | − | | | X | |
| 4 | + | | | | X |
| 5 | +/− | X | | X | |
| 6 | + | X | | | X |
| 7 | − | | | X | X |
| 8 | +/− | | X | | X |

TABLE 1b

| Case | Wheel rotates backward, α > 0 c-sign of the lateral force | Dynamic state of the roller — Roller drives wheel | Dynamic state of the roller — Roller brakes wheel | Dynamic state of the vehicle — Wheel drives roller | Dynamic state of the vehicle — Wheel brakes rollers |
|---|---|---|---|---|---|
| 1 | − | X | | | |
| 2 | + | | X | | |
| 3 | + | | | X | |
| 4 | − | | | | X |
| 5 | +/− | X | | X | |
| 6 | − | X | | | X |
| 7 | + | | | X | X |
| 8 | +/− | | X | | X |

Here, it is true:

α—angle of the projection of the wheel center plane in the x, y plane c—sign of the lateral force from the tire to the roller in y direction of the roller coordinate system If there is no entry in one cell in both tables, this means that the roller or the wheel, respectively, are to be considered to freely rotating.

As far as two optional signs +/− are indicated for an operational state in the tables 1a and 1b, the sign depends on whether the operational state of the roller or of the wheel is stronger and thus "dominates" the situation.

Tables 1a and 1b each show 6 dynamic states of vehicle and drive system in which the wheel mount—corresponding to the sign of c—with securing (pinning) in the slot in the front or back satisfies the stability condition α*M>0.

For the cases c=−1, the pinning has to be effected in the front, for the cases c=1, the pinning has to be effected in the back.

In the cases 5 and 8 of the tables 1a and 1b, a decision can not be made with this examination which sign c has and thus whether the pinning of the slot of the wheel mount is to be effected in the front or back. Therefore, in these cases, this situation can occur: α*M<0

If the coupled double roller of the wheel mount as well as the wheel are in the dynamic states which correspond to the cases 5 and 8 of the tables 1a and 1b, the situation α*M>0 can be re-established through decoupling a roller with suitable setting of the first or second working state. The decoupling of a roller here means that the coupling is opened which is assigned to this roller. This roller is thus separated from the drive system. The coupling which is assigned to the other roller remains closed so that this roller remains connected with the drive system.

For describing this stabilization through decoupling a roller, the case is to be examined in an exemplary manner that the wheel is accelerated by the vehicle drive and by the drive of the vehicle test bench to save time for the reaching of a certain speed of the wheel. Under the basic condition that α>0 is true and the wheel mount is in the first working state (i.e. linear drive secured in the front), both coupled rollers find themselves in case 5 of table 1a and it is true: $M=-(d_v+d_h)*F_y$ according to (1), wherein $F_y=F_{yv}=F_{yh}$ can be positive or negative. But if the back roller is decoupled, the front roller finds itself in case 5 according to table 1a, the back roller is in case 3 according to table 1a and it is true: $M=-d_v*F_{yv}-d_h*F_{yh}>0$, as $d_h>d_v$, $|F_{yh}|>|F_{yv}|$ und $F_{yh}<0$ Thus, the stable situation α*M>0 is established by decoupling a roller.

Hereinafter, a vehicle test bench is to be examined having a secured vehicle driving thereon. The vehicle test bench has solid wheel mounts under the rear axle and steerable wheel mounts under the front axle.

The steering produces the angle $\alpha_l$ on the left steerable wheel mount and the angle αr on the right steerable wheel mount. Each of the steerable wheel mounts can be rotated around the Z axis of the vehicle test bench by the angle $\phi_r$ or $\phi_l$ in such a way, that the axes of the wheel mount are collinear with the wheel axles of the front wheels, i.e.: $\alpha_l=0$ and $\alpha_r=0$, irrespective of the position of the steering wheel.

For illustrating the function, this process of alignment with the right steerable wheel mount is described, i.e. $\alpha=\alpha_r$ and $\phi=\phi_r$.

The front or the back linear drive, respectively, according to the sign of c in the cases 1, 2, 3, 4, 6 and 7 of table 1a or table 1b, respectively, are secured with respect to the dynamic state of the two coupled rollers and the vehicle. Through the securing of the respective linear drive, the respective pinning is activated, i.e. the respective rotational axis of the floating plate is set. This is true for the exemplary embodiment with the shown two linear drives.

Thus, the stability condition α*M>0 is satisfied and the other linear drive measures the direction of the acting force $$2*F_y*\cos(\phi) \text{ in } \pm Y \text{ direction}$$

and generates a force $F_{LA}$ in direction of the acting force $$2*F_y*\cos(\phi) \text{ so that the friction of the floating plate } \mu*G \text{ is overcome.}$$

G includes the weight of the wheel mount plus the part of the weight force of the vehicle which acts on the wheel mount. The alignment of the wheel mount with the steered wheel is effected if it is true:

$$2*|F_y|*\cos(\phi)+|F_{LA}|>=\mu*G \quad (13)$$

if α*M>0.

If the stability condition with coupled rollers is not satisfied in the cases 5 and 8 of table 1a or 1b and it is true: α*M<0, then a linear drive is also secured in the front or back.

The other linear drive measures the direction of the acting force $2*F_y*\cos(\phi)$ in ±Y direction and generates a counter force $F_{LA}$ in the opposite direction of the acting force $2*F_y*\cos(\phi)$ and the friction of the floating plate
$\mu*G$.

The alignment of the wheel mount with the steered wheel is effected if it is true:

$|F_{LA}| >= \mu*G + 2*|F_y|*\cos(\phi)$ (14)

if α*M<0.

The correct alignment of the steerable wheel mount is achieved if the force measurement on the non-secured linear drive measures the value zero, i.e.:

$2*F_y*\cos(\phi)=0$

Alternatively, the regulation process can, for example, also be effected via the measuring of the angle α with respect to the wheel mount. To that end, each steerable wheel mount has to have such a measuring system.

Figure 6:
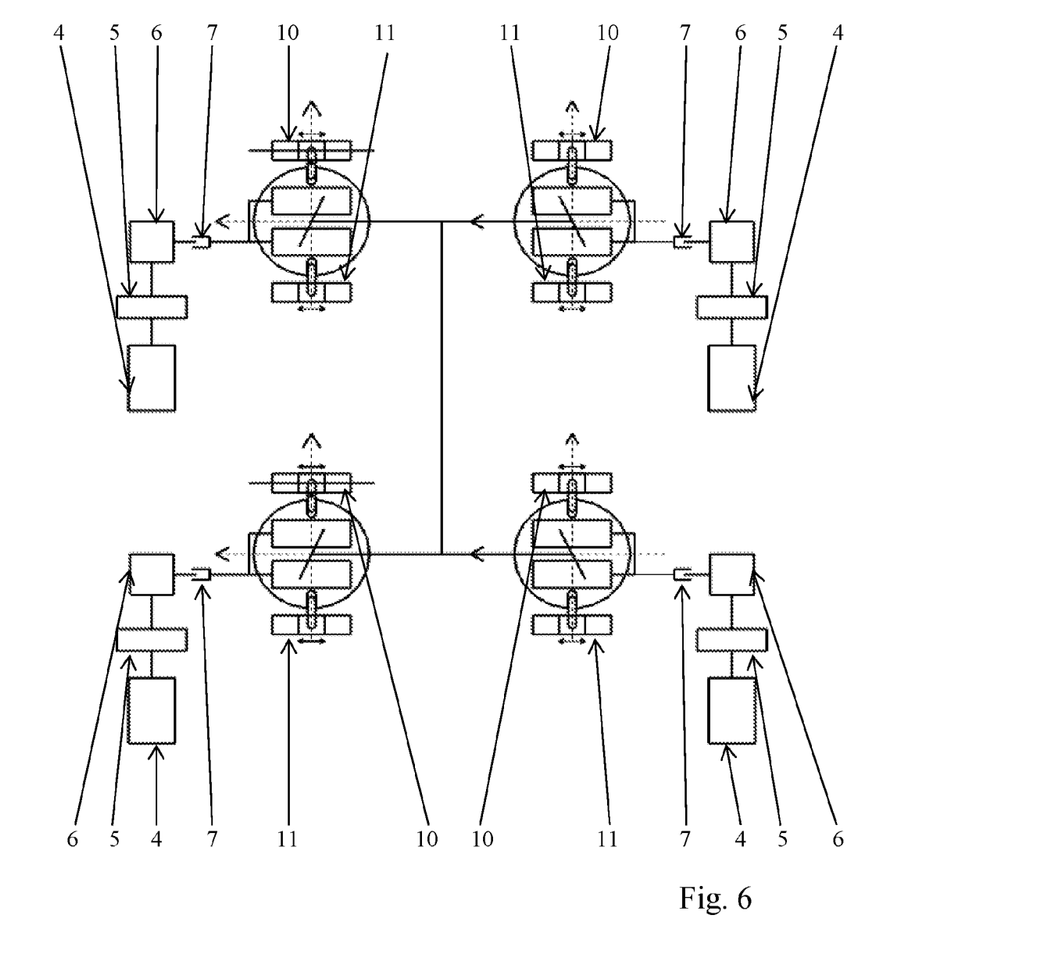
FIG. 6: a schematic diagram of a vehicle test bench with steerable wheel mounts below the front axle as well as below the rear axle of a secured vehicle.

FIG. 6 shows a schematic illustration of a vehicle test bench with steerable wheel mounts under the front axle as well as under the rear axle of a secured vehicle. Here, the vehicle can again be considered secured if the wheel mounts are moved so fast that forces of the wheel mount on the vehicle are already eliminated before the vehicle laterally drifts. Alternatively, the vehicle can also be secured by being mechanically held.

The relationships described in conjunction with FIG. 5 are correspondingly also true in the exemplary embodiment of FIG. 6 for the wheel mounts located under the rear axle of the vehicle.

Figure 7:
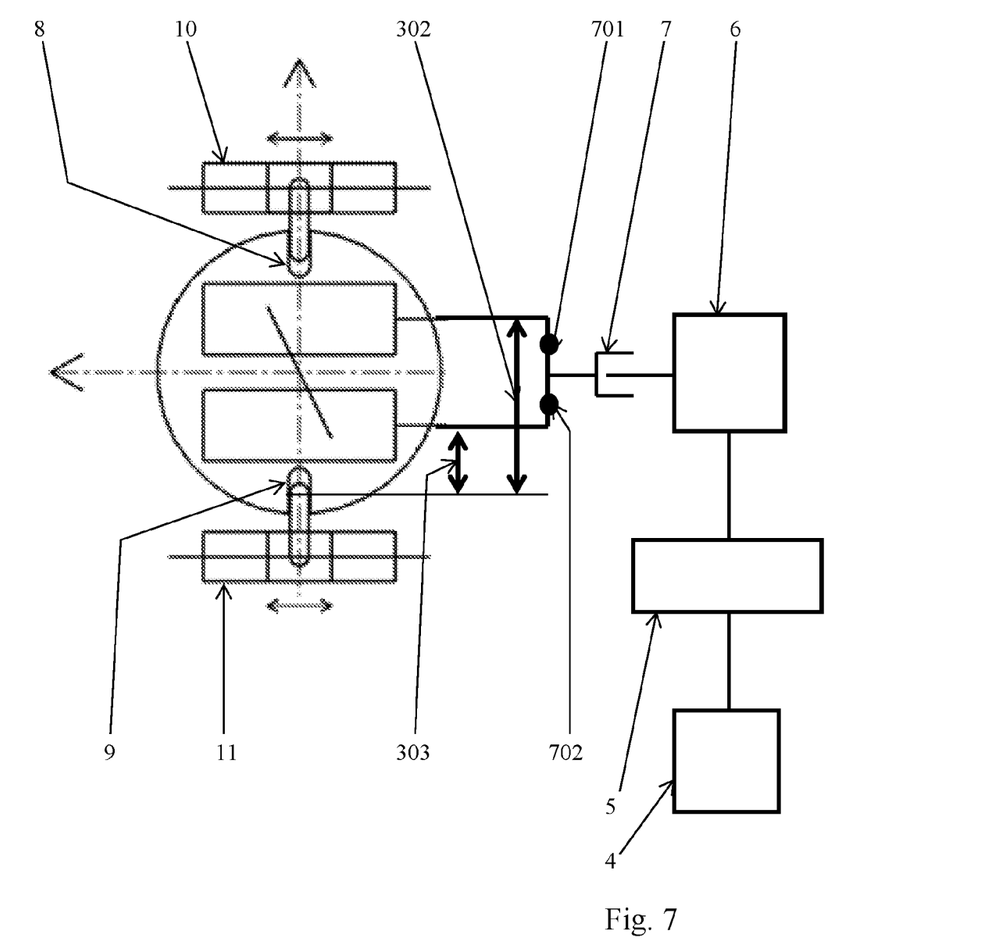
FIG. 7: a schematic diagram of a wheel mount with a roller system which is configured as a double roller, wherein each of the rollers is connected to the drive via a coupling.

FIG. 7 shows a schematic illustration of a wheel mount with a roller system which is configured as a double roller. It can be seen that the drive system, which in the exemplary embodiment of FIG. 7 consists of the drive 4, the oscillating mass 5, the gear 6 as well as the adjusting element 7, can be coupled or decoupled, respectively, for each of the two rollers using a coupling 701 or 702, respectively.

Through the drawn distances of the axles of the respective rollers to the back pinning in the slot 9 (distance $d_v$ with the reference character 302 for "front" roller as well as distance $d_h$ with the reference character 303 for the "back" roller), the FIG. 7 can.

In the above tables 1a and 1b, there are dynamic states of the wheel and the roller system which are not yet clearly defined with the at first yet general indication that the wheel drives (or brakes) the roller(s) as well as also the roller(s) drive (or brake) the respective wheel.

Through a suitable switching of the couplings 701 and 702, the relationships can be clarified in terms of a clearer determination whether the pinning is to be effected in the front or in the back.

The invention claimed is:

1. Wheel mount for a vehicle test bench for motor vehicles having steerable wheels, wherein the wheel mount comprises a floating plate as well as at least one roller supported on the floating plate and movable with the floating plate in a horizontal plane, characterized in that the wheel mount has a first working state, in which the part of the floating plate, on which the at least one roller is supported, is rotatably supported around a vertical axis (8), which is located ahead of the at least one wheel contact point on the at least one roller of the wheel mount with respect to the driving direction of a vehicle located in the roller dynamometer, in that the wheel mount has a second working state, in which the part of the floating plate, on which the at least one roller is supported, is rotatably supported around a vertical axis (9) which is located behind the at least one wheel contact point on the at least one roller of the wheel mount with respect to the driving direction of a vehicle located in the roller dynamometer, and in that actuators (10, 11) are assigned to the floating plate for rotating the part of the floating plate, on which the at least one roller is supported, around the corresponding vertical axis (8, 9) in the first as well as in the second working state.

2. Wheel mount according to claim 1, characterized in that the at least one roller of the wheel mount consists of a double roller, wherein each of the rollers is connected to a drive system (4, 5, 6) via a switchable coupling (701, 702).

3. Wheel mount according to claim 1, characterized in that coupling means (8; 9) of in each case one drive system (10; 11) are engaged with the wheel mount in such a way, that by blocking one of the drive systems (10; 11) with simultaneous actuation of the other drive system (11; 10), the part of the floating plate, on which the at least one roller is supported, is rotated in the first working state or the second working state.

4. A method for actuating the actuators of a floating plate according to claim 1,
   characterized in that the part of the floating plate, on which the at least one roller is supported, is rotated to a target position using the actuators in such a way that the axis of the at least one roller of the wheel mount runs parallel to a projection of the wheel axle of the wheel standing on the at least one roller in vertical direction into the horizontal plane, wherein the rotation is effected in the first working state of the floating plate or in the second working state of the floating plate, depending on the direction and magnitude of a steering angle of the vehicle wheel, as well as depending on whether the vehicle wheel drives or brakes the at least one roller or is driven or braked by the at least one roller.

5. Method according to claim 4, characterized in that setting of the first or the second working state of the wheel mount is effected with one roller or with coupled double rollers, depending on at least one of the following combinations of a dynamic state of the vehicle as well as a dynamic state of the individual roller or the coupled double rollers, of the wheel mount; and
   wherein the first working state is set when a lateral force from a tire to the roller in y direction of the roller coordinate system has a negative value (−), and wherein the second working state is set when a lateral force from the tire to the roller in y direction of the roller coordinate system has a positive value (+).

6. Method according to claim 2, characterized in that a switchable couplings (701, 702) of at least one wheel mount of the vehicle test bench are shifted in terms of a targeted adjustment of the torque of the floating plate of the wheel mount with respect to the first or the second working state.

* * * * *